(12) United States Patent
Ben Old (10) Patent No.: US 9,671,031 B2
(45) Date of Patent: Jun. 6, 2017

(54) WIRELESS ELECTRIC VALVE FOR AUTOMATIC CLOSING AND OPENING OF MAIN FLUID PIPE (71) Applicant: Mordechai Ben Old, Petah Tikva (IL)

(72) Inventor: Mordechai Ben Old, Petah Tikva (IL)

( * ) Notice: Subject to any disclaimer, the term of this patent is extended or adjusted under 35 U.S.C. 154(b) by 0 days.

(21) Appl. No.: 14/929,346

(22) Filed: Nov. 1, 2015

(65) Prior Publication Data
US 2017/0122453 A1   May 4, 2017

(51) Int. Cl.
*F16K 31/05* (2006.01)
*F16K 31/04* (2006.01)

(52) U.S. Cl.
CPC .......... *F16K 31/042* (2013.01); *F16K 31/043* (2013.01); *F16K 31/055* (2013.01)

(58) Field of Classification Search
CPC ..... F16K 31/042; F16K 31/043; F16K 31/055
USPC ................ 251/129.11–129.13, 292, 305–308
See application file for complete search history.

(56) References Cited

U.S. PATENT DOCUMENTS

| | | | | |
|---|---|---|---|---|
| 3,085,781 A * | 4/1963 | La Pointe | ............ | F16K 31/043 251/67 |
| 5,967,171 A * | 10/1999 | Dwyer, Jr. | ........... | D06F 39/081 137/312 |
| 6,070,852 A * | 6/2000 | McDonnell | ............... | F02D 9/02 123/396 |
| 6,170,509 B1 * | 1/2001 | Karta | ...................... | F16K 31/06 137/78.4 |
| 6,186,162 B1 * | 2/2001 | Purvis | ................... | D06F 39/081 122/504.2 |
| 6,662,821 B2 * | 12/2003 | Jacobsen | ................. | F16K 31/05 251/292 |
| 7,066,192 B1 * | 6/2006 | Delaney | ................ | F16K 31/055 251/129.04 |
| 7,207,545 B2 * | 4/2007 | Kawai | ................... | F02D 9/1065 251/129.11 |
| 7,604,216 B2 * | 10/2009 | Gebler | ................. | F16K 5/0652 251/129.11 |
| 8,256,742 B2 * | 9/2012 | Staffiere | ............... | F16K 31/055 251/129.11 |
| 2006/0124171 A1 * | 6/2006 | Ghazarian | ................. | F17D 5/06 137/312 |
| 2008/0078973 A1 * | 4/2008 | Richards | ................ | E03B 7/071 251/315.1 |
| 2014/0001383 A1 * | 1/2014 | Staffiere | ............... | F16K 31/055 251/129.01 |

* cited by examiner

*Primary Examiner* — John Bastianelli (57) ABSTRACT

An automatic, wireless electric valve designed to be installed on a main fluid pipe that receives wireless, remote open and close commands, and which comprises an external casing, an electric motor, an internal power supply, an inner pipe with an inlet, an outlet, and a disc, an inner clamp, a primary cogwheel that is attached to the electric motor by means of an axle, a secondary cogwheel that is attached to the rotation shaft, and an electronic control mechanism.

1 Claim, 9 Drawing Sheets

WIRELESS ELECTRIC VALVE FOR AUTOMATIC CLOSING AND OPENING OF MAIN FLUID PIPE

CROSS-REFERENCE TO RELATED APPLICATIONS

Not applicable

TECHNICAL FIELD

The present invention refers to a wireless electric valve for the automatic closing and opening of a main fluid pipe in response to a wireless command received from an external source such as an alarm system.

BACKGROUND ART

Many structures are equipped with fixtures, objects and equipment that are sensitive to moisture and are susceptible to damage in case of water flooding. For example, residential homes may contain expensive antique rugs, wall-to-wall carpeting, or expensive parquet floors; research laboratories may contain sensitive equipment, and so on. Water flooding in such structures usually occurs due to a rupture in the structure's water pipeline. If such a rupture occurs while the structure is occupied (i.e., someone is in the structure), the rupture is discovered immediately and the person present makes sure the main water valve is shut off. If, however, such a rupture occurs when the structure is unoccupied (i.e., there is nobody in the structure), potential damages due to water flooding may be especially heavy. Such damage can, of course, occur due to leakage of fluids other than water, and this is true especially for manufacturing facilities, laboratories, etc. There is a clear need in such structures for a system that will prevent flooding in case of a ruptured water pipe or a ruptured pipe conveying any other fluid, particularly when the structure is unoccupied. There is also a clear need for a system that will prevent the flow of water (or any other fluid) in the structure's piping the moment such flooding begins, so as to minimize potential damage. The present invention describes a system that offers a good and effective solution to the above-described problems.

DESCRIPTION OF THE DRAWINGS

The intention of the drawings attached to the application is not to limit the scope of the invention and its application. The drawings are intended only to illustrate the invention and they constitute only one of its many possible implementations.

THE INVENTION

The main objective of the present invention is to provide a valve designed to be installed on a main fluid pipe. Another objective of the present invention is to provide a valve, as mentioned, that is equipped with an electric motor with an inner power source. Yet another objective of the present invention is to provide a valve, as mentioned, that is equipped with an electric control mechanism designed to receive remote wireless commands to close and open the valve.

The valve, subject of the present invention, provides a solution for the prevention of damage due to water flooding. In many cases, however, damage is caused by the rupture of pipes carrying other kinds of fluids, and so in this application we use the general word "fluids". In addition, the valve, subject of the present invention, may be installed on the main fluid pipe entering the structure or in any other location, and the expression "main pipe" refers in fact to any fluid pipe. The user may decide as to the appropriate location for the installation of the valve according to the piping and zoning of the structure that requires flood protection in case of pipe rupture. The valve may be installed on a pipe and serve as a valve, as mentioned, or it may be installed in place of a main stopcock, so that it may serve as both a stopcock and a valve.

The valve (1), subject matter of the present invention, is an automatic wireless electric valve. The valve (1) comprises a casing (2), an electric motor (3), an internal power source (31), an inner pipe (4) with an inlet (41), an outlet (42) and a butterfly (43), an inner clamp (5), a rotation shaft (44), a primary cogwheel (32) that is attached to the electric motor by means of a motor axle (33), a secondary cogwheel (45) that is attached to the rotation shaft, and an electronic control mechanism (6). The valve may also be equipped with a manual handle (7) that enables manual opening and closing of the valve (1).

Figure 1:
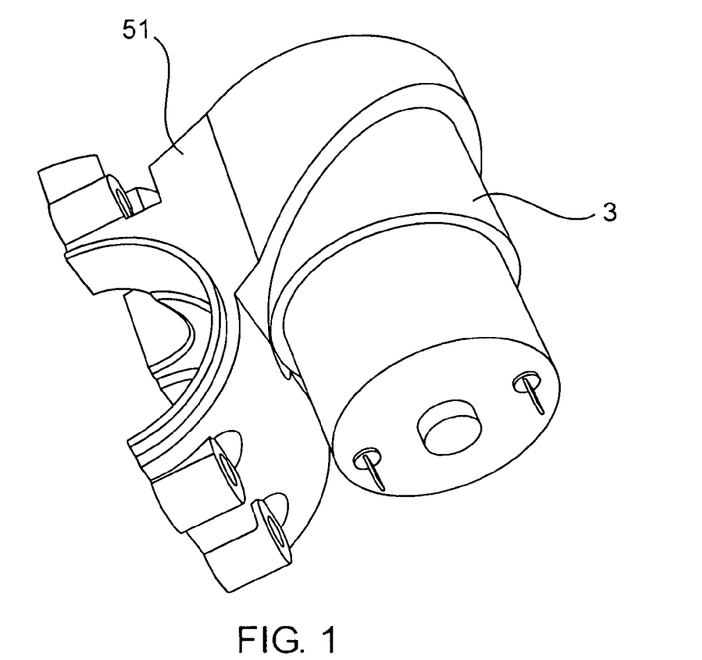
FIGS. 1 and 2 depict the motor (3) whereby it is attached to the inner clamp (5).
Figure 2:
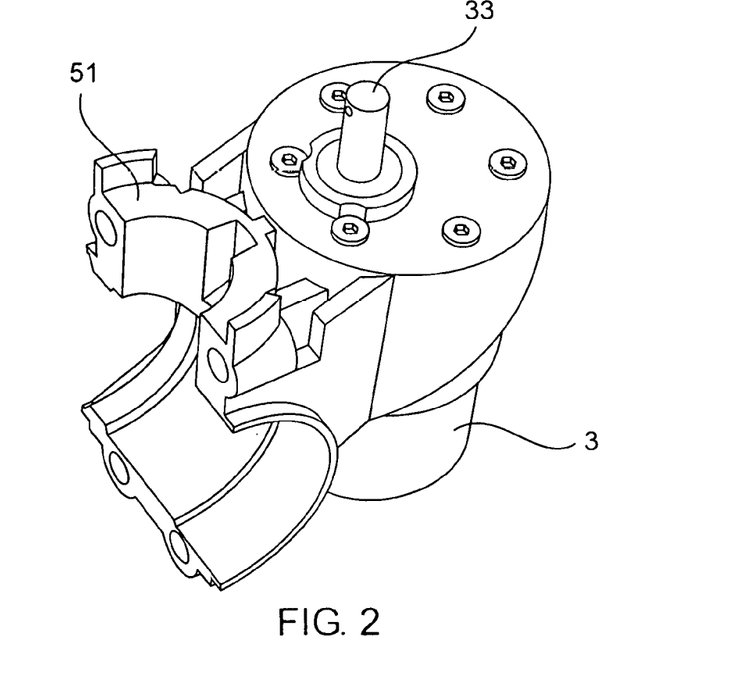
Figure 3:
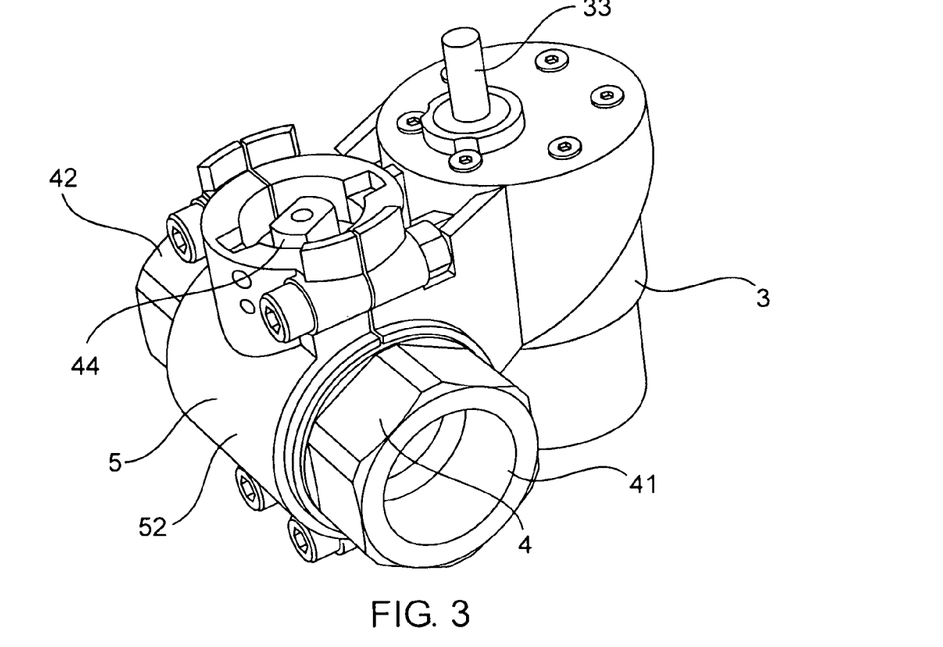
FIGS. 3 and 4 depict the electric motor (3) whereby it is attached to the inner clamp (5), into which the inner pipe (4) is inserted.
Figure 4:
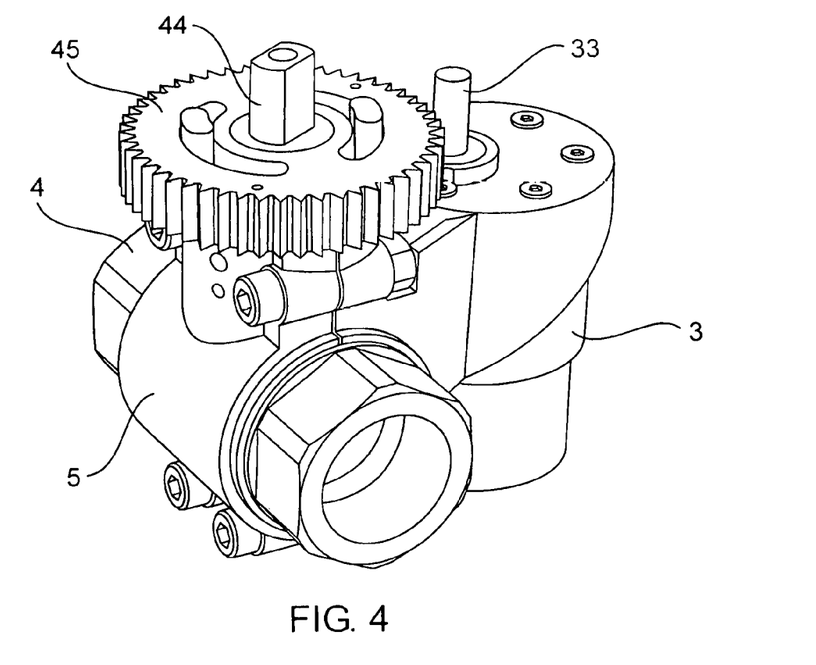

FIGS. 1 and 2 depict the electric motor (3) whereby it is attached to the inner clamp (5). The inner clamp comprises a first part (51) and a second part (52). FIGS. 1 and 2 show only the first part (51) and the second part (52) is shown in FIGS. 3 and 4 which depict the electric motor (3) whereby it is attached to the inner clamp (5), which incorporates the inner pipe (4). These Figs also depict the motor axle (33) that is connected to the electric motor (3) so that when the electric motor revolves, the motor axle revolves around its longitudinal axis. FIG. 4 also depicts the rotation shaft (44) that is attached to the butterfly (43). The rotation shaft (44) is designed so that it turns the butterfly (43) so that it is either perpendicular or parallel to the inner pipe (4), thus closing or opening it and, in turn, closing or opening the main pipe on which the valve (1) is installed.

Figure 5:
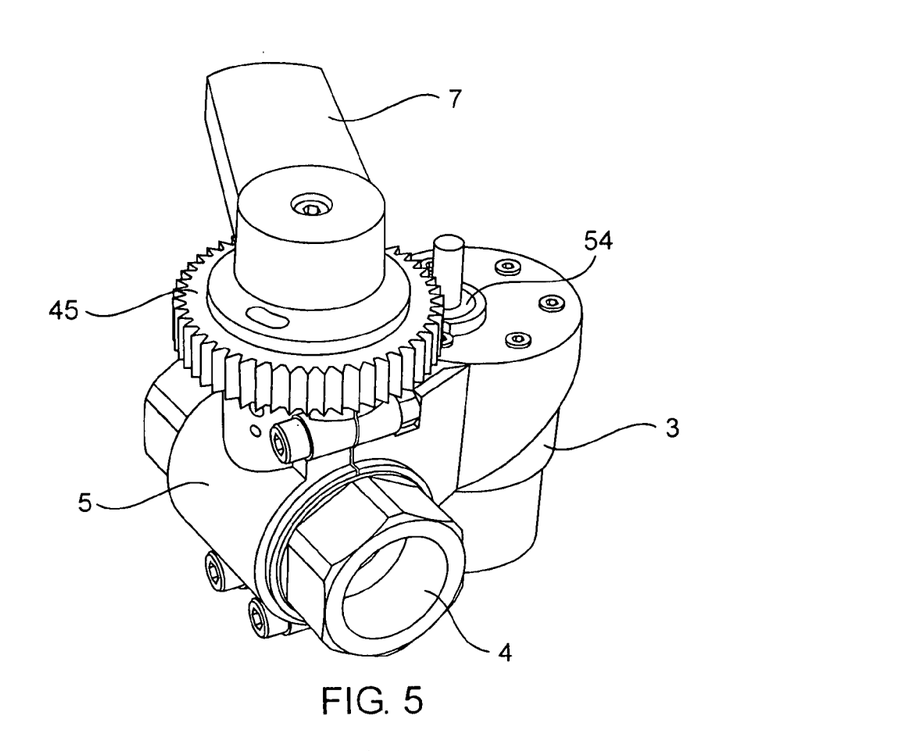
FIG. 5 depicts the electric motor (3), the inner clamp (5), the inner pipe (4), the motor axle (33), the rotation shaft (44), the secondary cogwheel (45), and the manual handle (7).
Figure 6:
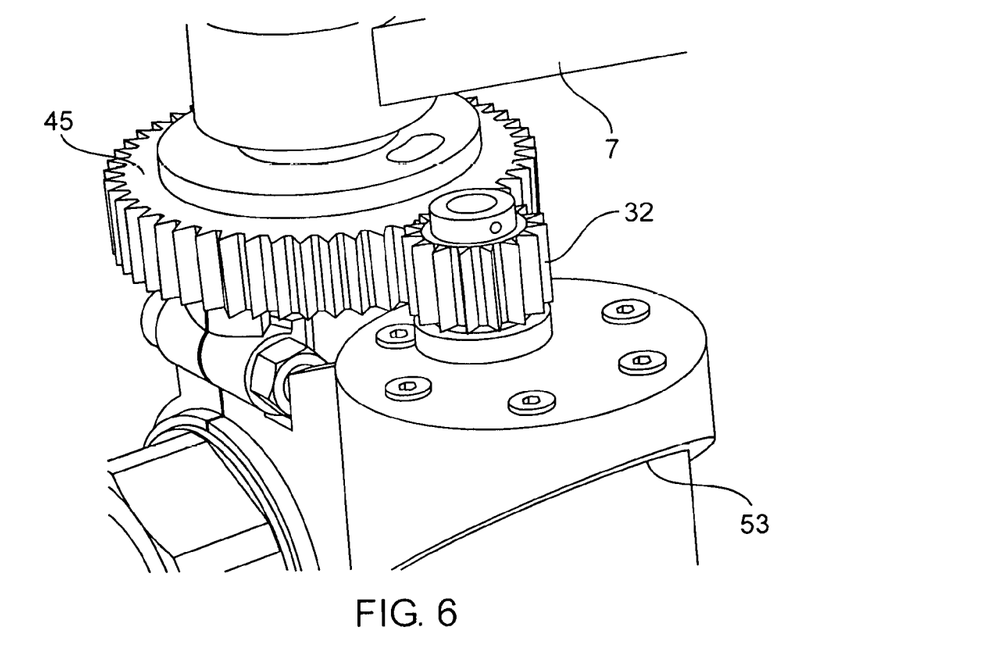
FIG. 6 depicts the primary cogwheel (32) and the way in which it meshes with the secondary cogwheel (45).
Figure 7:
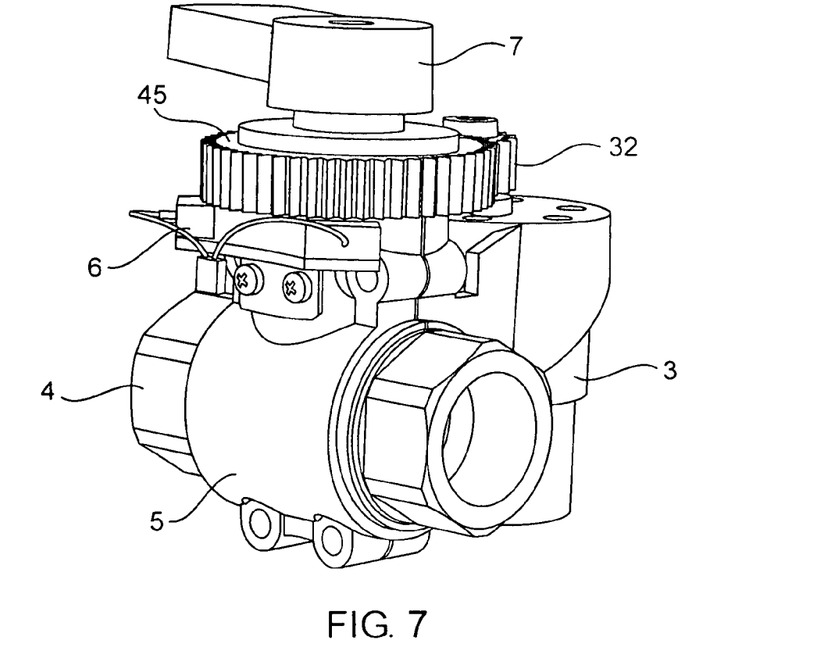
FIGS. 7-9 depict the components of the valve (1) and the way in which the electronic control mechanism (6) is assembled in it.
Figure 8:
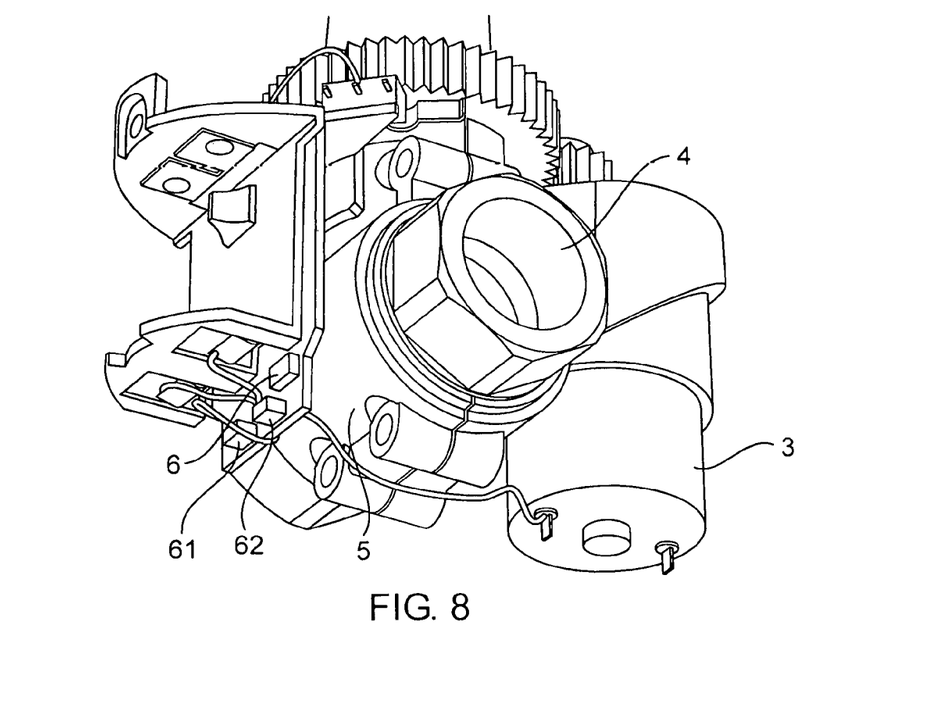
Figure 9:
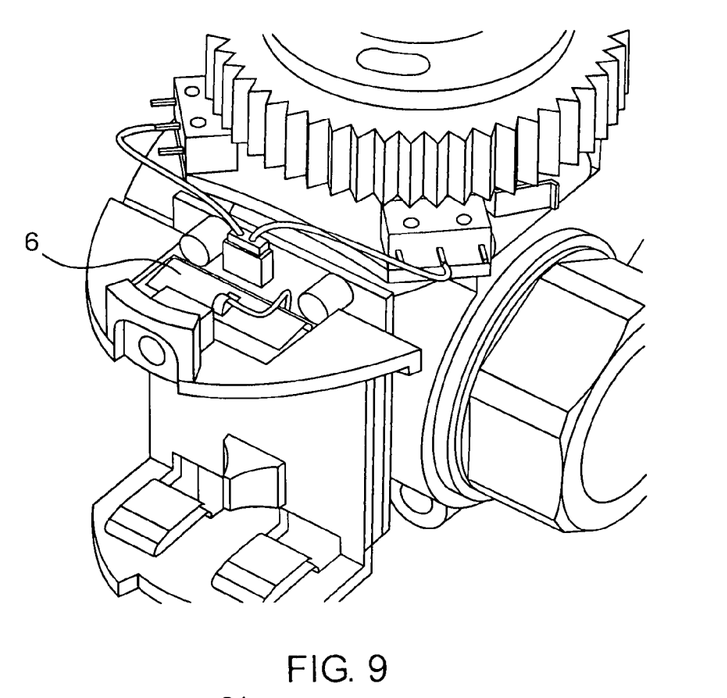
Figure 10:
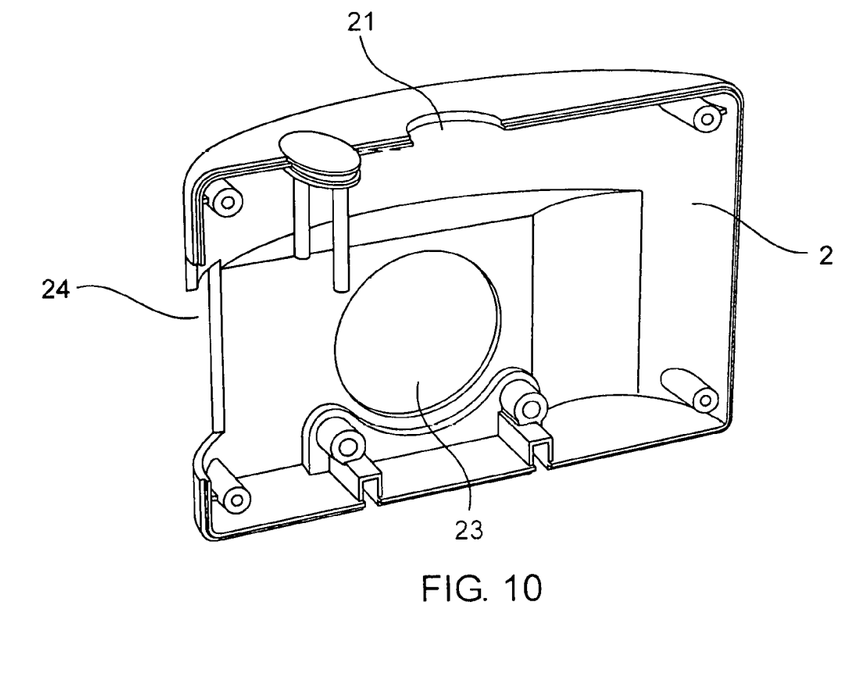
FIG. 10 depicts part of the casing (2).
Figure 11:
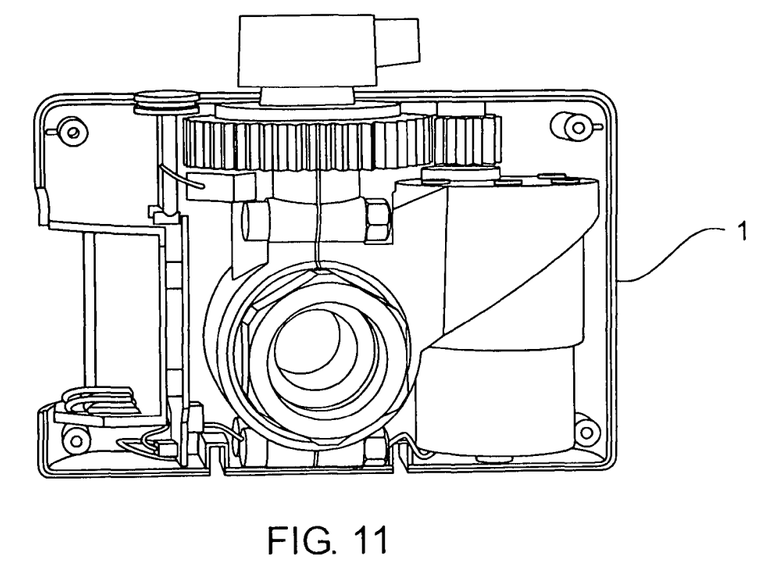
FIG. 11 depicts the components of the valve (1) when assembled within the casing (2).
Figure 12:
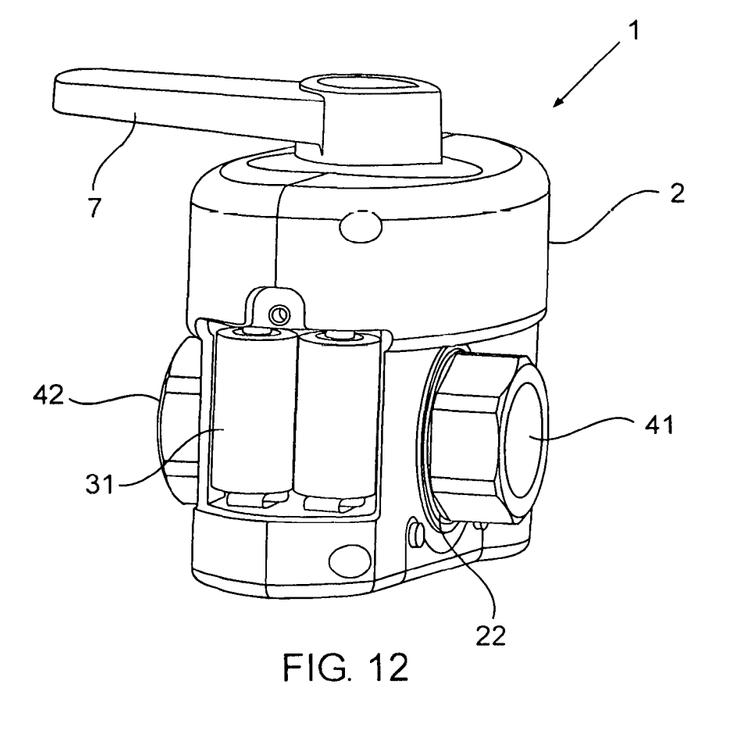
FIGS. 12-14 depict the valve (1) in assembled state.
Figure 13:
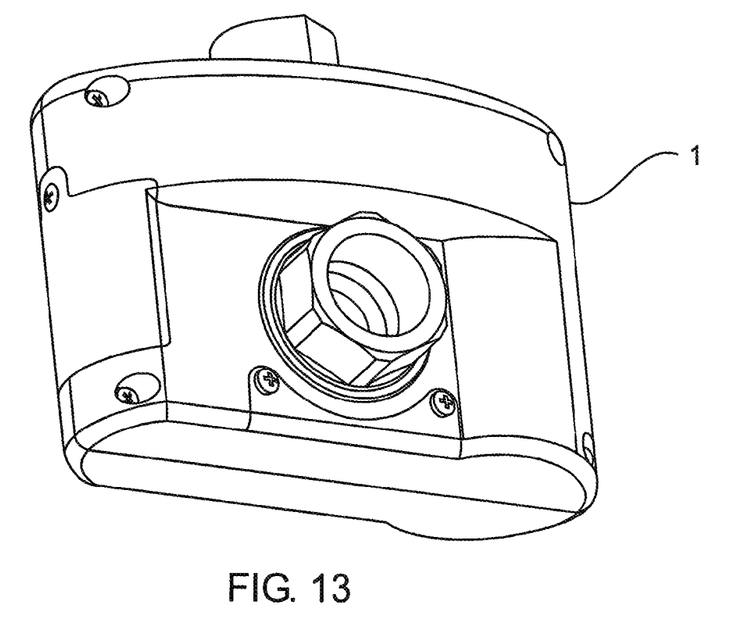
Figure 14:
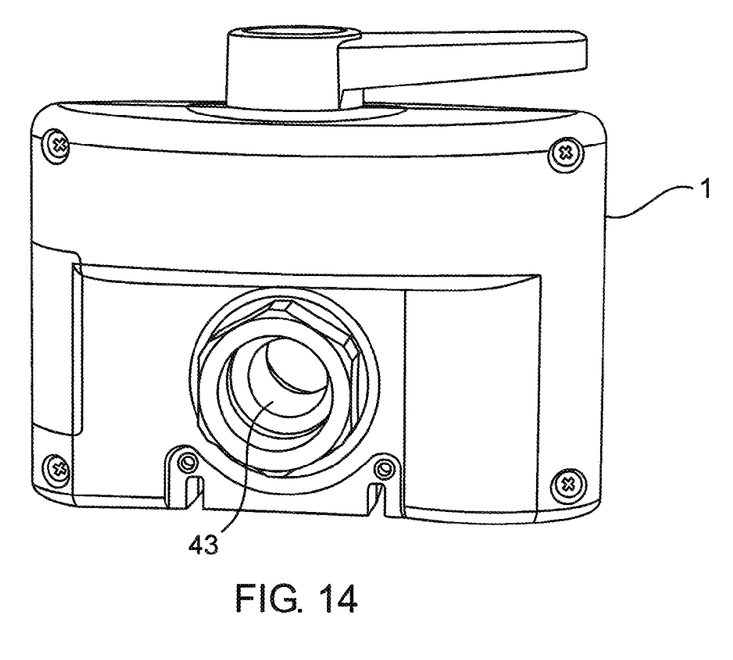
Figure 15:
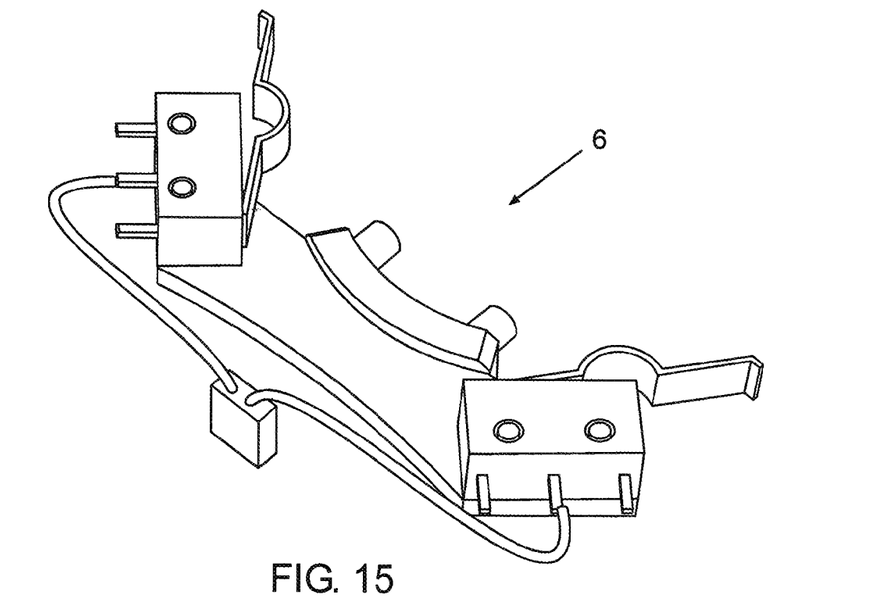
FIGS. 15-18 depict the electronic control mechanism (6), which includes a receiver and a printed circuit board.
Figure 16:
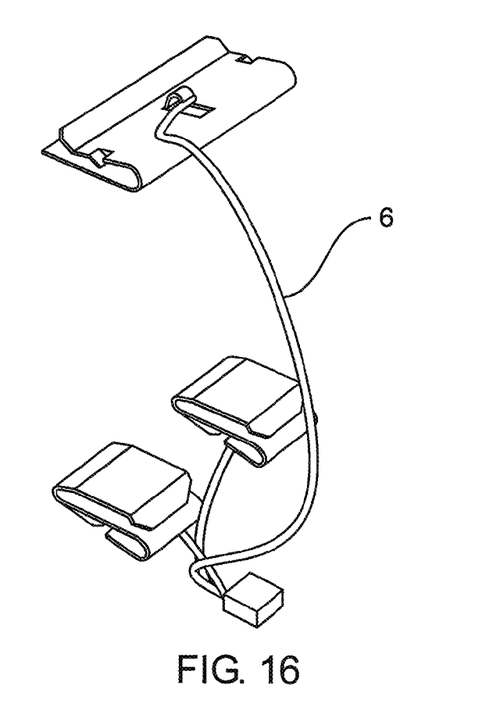
Figure 17:
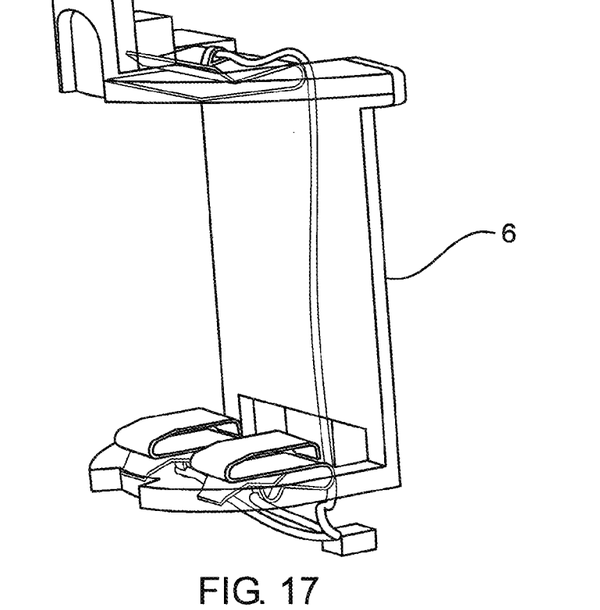
Figure 18:
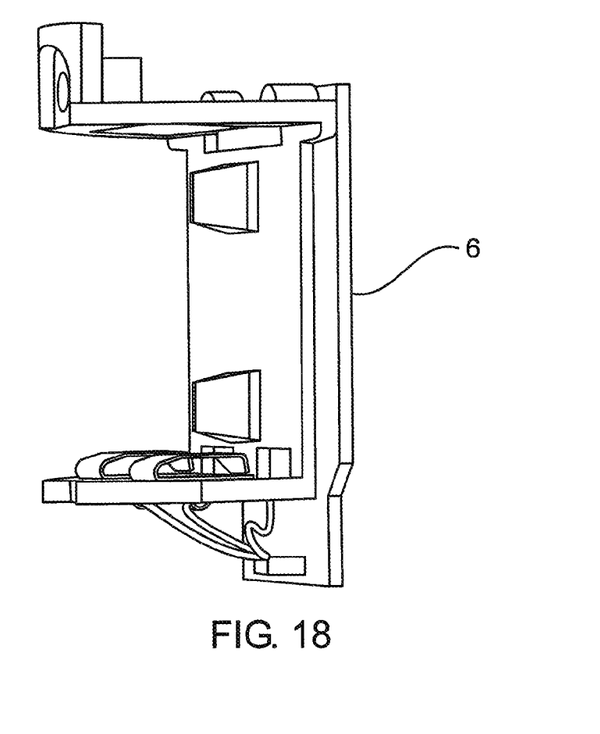

FIG. 5 depicts the system depicted in FIG. 4 as well as the secondary cogwheel (45) that is mounted on the rotation shaft (44), and the manual handle (7). FIG. 6 depicts the primary cogwheel (32), which is mounted on the motor axle (33). FIGS. 7-9 depict the assembly of the electronic control mechanism (6) and its integration in the valve (1). FIG. 10 depicts a part of the casing (2) and FIG. 11 depicts the components of the valve (1) when assembled within the casing (2). FIGS. 12-14 depict the valve (1) in assembled state. FIGS. 15-18 depict the electronic control mechanism (6), which includes a receiver and a printed circuit board.

The electronic control mechanism (6) connects the internal power source (31) to the electric motor (3) and controls the activation and deactivation of said motor.

Mode of operation of the valve (1): The valve (1) is installed on the main fluid pipe so that one end of the main pipe is connected to the inlet (41) and the other end is connected to the outlet (42). When a wireless command to close the valve (1) is transmitted, it is received by the receiver of the electronic control mechanism (6) which activates the electric motor (3) and as a result the motor axle (33) revolves around its axis and turns the primary cogwheel (32). The primary cogwheel (32) is meshed with the secondary cogwheel (45), as depicted for instance in FIG. 6, and so the secondary cogwheel (45) turns as well. As a result, the rotation shaft (44) revolves around its axis causing the butterfly (43) to turn so that it is perpendicular to the pipe and shutting off the flow of fluid through the main pipe. When a wireless command to open the valve is transmitted, the above sequence of operations is executed in the opposite direction.

The command to open or close the valve (1) may be transmitted to the electronic control mechanism (6) from one of several sources, such as moisture sensors that may be installed in relevant, flood-prone locations in the structure so that when they identify moisture, a command is transmitted to close the valve. Another possibility is to program the structure's alarm system to transmit a command to close the valve (1) whenever the alarm system is activated and to transmit a command to open the valve whenever the alarm system is deactivated. As mentioned in the Background, the flooding problem is aggravated when the structure is unoccupied, since if there is someone in the structure, that person may shut off the main stopcock before any significant damage is incurred. Alarm systems in structures are usually activated when the last person leaves the structure and are deactivated when they return. Thus, whenever there the structure is unoccupied, the main water pipe is shut off, a state that should pose no problem since there are no people in the structure who require water, and vice versa. The system, whereby the valve (1) is integrated with the programming of an existing alarm system that transmits commands to open and close said valve, constitutes an important tier in the protection against flood damage.

As it is understood from Figs and the explanations above, the present patent application relates to the automatic wireless electric valve (1) that is designed to be installed on the main fluid pipe and to receive remote wireless open and close commands. The automatic wireless electric valve (1) includes the casing (2), the electric motor (3), the internal power source (31), the inner pipe (4) with inlet (41), outlet (42) and a butterfly (43), the inner clamp (5), the rotation shaft (44), the primary cogwheel (32) that is attached to the electric motor (3) by means of the motor axle (33), the secondary cogwheel (45) that is attached to the rotation shaft (44), and the electronic control mechanism (6).

The inner clamp includes the first part (51) and the second part (52) wherein the first part (51) includes a chamber (53) in which the electric motor is incorporated as shown for example in FIG. 1. The inner pipe (4) is incorporated into the inner clamp (5). The motor axle (33) is attached to the electric motor (3) so that when the electric motor turns, the motor axle revolves around its longitudinal axis. The motor axle (33) is protruded through a hole (54) in the chamber (53). The primary cogwheel (32) is assembled on the motor axle (33). The secondary cogwheel (45) is assembled on the rotation shaft (44). The primary cogwheel (32) is meshed with the secondary cogwheel (45). The rotation shaft is attached to the butterfly and is designed to turn the butterfly so as to close or open the inner pipe. The electronic control mechanism (6) includes the receiver (61) and the printed circuit board (62). The electronic control mechanism (6) connects the internal power source to the electric motor and controls activation and deactivation of the electric motor.

The casing (2) as it is shown in FIGS. 10-14 includes an upper opening (21) through which the manual handle (7) is attached to the rotations shaft (44), two sided openings (22) and (23) that enable access to the inlet and the outlet of the inner pipe which are designed to be connected to the main fluid pipe, and a rear opening (24) that enables access to the internal power source. The automatic wireless electric valve (1) is designed in a way that all its components are contained inside the casing whereby enabling a user to install the automatic wireless electric valve (1) on the main fluid pipe easily.

When the electronic control mechanism receives a wireless command to close or open the automatic wireless electric valve (1), the following operations take place: the electronic control mechanism activates the electric motor, which turns the motor axle, the primary cogwheel, the secondary cogwheel, the rotation shaft, and the butterfly whereby closing or opening the inner pipe.

What is claimed is:

1. An automatic wireless electric valve that is designed to be installed on a main fluid pipe and to receive remote wireless open and close commands, comprising: a casing, an electric motor, an internal power source, an inner pipe with an inlet, an outlet and a butterfly, an inner clamp, a rotation shaft, a primary cogwheel that is attached to the electric motor by means of a motor axle, a secondary cogwheel that is attached to the rotation shaft, and an electronic control mechanism;

wherein the inner clamp includes a first part and a second part; wherein the first part of the inner clamp includes a chamber in which the electric motor is incorporated;

wherein the inner pipe is incorporated into the inner clamp; wherein the motor axle is attached to the electric motor so that when the electric motor turns, the motor axle revolves around its longitudinal axis; wherein the motor axle is protruded through a hole in the chamber; wherein the primary cogwheel is assembled on the motor axle; wherein the secondary cogwheel is assembled on the rotation shaft; wherein the primary cogwheel is meshed with the secondary cogwheel; wherein the rotation shaft is attached to the butterfly and is designed to turn the butterfly so as to close or open the inner pipe;

wherein the electronic control mechanism includes a receiver and a printed circuit board; wherein the electronic control mechanism connects the internal power source to the electric motor and controls activation and deactivation of the electric motor;

wherein the casing includes an upper opening through which a manual handle is attached to the rotation shaft, two sided openings that enable access to the inlet and the outlet of the inner pipe, and a rear opening that enables access to the internal power source;

wherein when the electronic control mechanism receives a wireless command to close or open the automatic wireless electric valve, the following operations take place: the electronic control mechanism activates the electric motor, which turns the motor axle, the primary cogwheel, the secondary cogwheel, the rotation shaft, and the butterfly whereby closing or opening the inner pipe;

wherein the electric motor, the internal power source, the inner pipe, the inner clamp, the rotation shaft, the primary cogwheel, the motor axle, the secondary cogwheel and the electronic control mechanism contained inside the casing whereby enabling a user to install the automatic wireless electric valve on the main fluid pipe easily.

* * * * *

(12) POST-GRANT REVIEW CERTIFICATE (169th)
United States Patent
Old

(10) Number: US 9,671,031 J1
(45) Certificate Issued: Feb. 19, 2021

(54) WIRELESS ELECTRIC VALVE FOR AUTOMATIC CLOSING AND OPENING OF MAIN FLUID PIPE

(71) Applicant: Mordechai Ben Old

(72) Inventor: Mordechai Ben Old

Trial Number:

PGR2018-00038 filed Mar. 1, 2018

Post-Grant Review Certificate for:

Patent No.: 9,671,031
Issued: Jun. 6, 2017
Appl. No.: 14/929,346
Filed: Nov. 1, 2015

The results of PGR2018-00038 are reflected in this post-grant review certificate under 35 U.S.C. 328(b).

POST-GRANT REVIEW CERTIFICATE
U.S. Patent 9,671,031 J1
Trial No. PGR2018-00038
Certificate Issued Feb. 19, 2021

AS A RESULT OF THE POST-GRANT REVIEW PROCEEDING, IT HAS BEEN DETERMINED THAT:

Claim 1 is cancelled.

\* \* \* \* \*